US008571541B2

(12) United States Patent
Seligmann et al.

(10) Patent No.: US 8,571,541 B2
(45) Date of Patent: Oct. 29, 2013

(54) PROXIMITY-BASED AUTHORIZATION

(75) Inventors: Doree Duncan Seligmann, New York, NY (US); Michael J. Sammon, Watchung, NJ (US); Lynne Shapiro Brotman, Westfield, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1304 days.

(21) Appl. No.: 10/891,867

(22) Filed: Jul. 15, 2004

(65) Prior Publication Data
US 2006/0014532 A1    Jan. 19, 2006

(51) Int. Cl.
    *H04M 3/00*    (2006.01)
(52) U.S. Cl.
    USPC .......................................... 455/420; 455/403
(58) Field of Classification Search
    USPC ............... 455/414.2, 418, 420, 456.1–456.6, 455/422.1, 440, 404.2, 403, 419, 414.1, 457
    See application file for complete search history.

(56) References Cited

U.S. PATENT DOCUMENTS

| 5,544,321 | A |   | 8/1996  | Theimer et al. |
|-----------|---|---|---------|----------------|
| 5,717,955 | A |   | 2/1998  | Swinehart |
| 5,778,304 | A | * | 7/1998  | Grube et al. ............... 455/456.4 |
| 5,944,825 | A | * | 8/1999  | Bellemore et al. ............... 726/18 |
| 6,154,172 | A | * | 11/2000 | Piccionelli et al. ........ 342/357.1 |
| 6,189,105 | B1 |  | 2/2001  | Lopes |
| 6,687,497 | B1 | * | 2/2004 | Parvulescu et al. ........... 455/420 |
| 6,757,722 | B2 |  | 6/2004  | Lonnfors et al. |
| 6,778,820 | B2 |  | 8/2004  | Tendler |
| 6,798,358 | B2 | * | 9/2004 | Joyce et al. ............... 340/995.24 |
| 6,836,667 | B1 | * | 12/2004 | Smith, Jr. .................. 455/456.1 |
| 2001/0004589 | A1 | * | 6/2001 | Massy et al. .................. 455/414 |
| 2002/0119788 | A1 | * | 8/2002 | Parupudi et al. .............. 455/456 |
| 2002/0186121 | A1 | * | 12/2002 | Yoshikawa et al. .......... 340/5.28 |
| 2003/0115481 | A1 |  | 6/2003 | Baird et al. |
| 2004/0043758 | A1 | * | 3/2004 | Sorvari et al. .............. 455/414.1 |
| 2005/0009511 | A1 | * | 1/2005 | Bostrom et al. .............. 455/419 |
| 2005/0159173 | A1 | * | 7/2005 | Dowling .................... 455/456.3 |
| 2005/0227731 | A1 | * | 10/2005 | Kall .............................. 455/560 |
| 2006/0014547 | A1 | * | 1/2006 | Walter ...................... 455/456.1 |

FOREIGN PATENT DOCUMENTS

| CN | 1411259 A    | 4/2003  |
| JP | 2002-366530 A | 12/2002 |
| JP | 2003-199170 A | 7/2003  |
| WO | WO 01/98866 A2 | 12/2001 |
| WO | 02/093501 A1  | 11/2002 |

(Continued)

OTHER PUBLICATIONS

J. Nakamoto, "JP Patent Application No. 2005-206297 Office Action", Apr. 30, 2008, Published in: JP.

(Continued)

*Primary Examiner* — Ajit Patel

(57) ABSTRACT

Methods and apparatuses are disclosed for enabling the response to a command from a wireless terminal to be based at least partially on the presence or absence of other users nearby, and possibly the identity of those users. In the illustrated embodiment, a server maintains an updated list of the locations of fixed and wireless terminals within an area (e.g., an IEEE 802.11 wireless access point's area of coverage, a CDMA base station's cell, etc.). When a user issues a command to his or her wireless terminal, the command is transmitted to the server. The server determines whether there are any other nearby wireless terminals (and inferentially, the users associated with these terminals), and then determines whether the command is authorized in that environment.

6 Claims, 15 Drawing Sheets

TELECOMMUNICATIONS SYSTEM 200

(56) References Cited

FOREIGN PATENT DOCUMENTS

| WO | WO 02093501 | | 11/2002 |
|---|---|---|---|
| WO | WO 03/107589 | * | 12/2003 |
| WO | WO 03/107589 A1 | | 12/2003 |
| WO | WO 04/002113 A1 | | 12/2003 |

OTHER PUBLICATIONS

Liu Man, "Chinese Patent Application No. 200510081977.1 Office Action", Feb. 13, 2009, Publisher: Patent Office of the People's Republic of China, Published in: CN.

J. Nakamoto, "JP Application No. 2005-206297 Office Action", Nov. 27, 2008, Published in: JP.

"CN Application No. 200510081977.1 Office Action Dec. 21, 2007", , Publisher: SIPO, Published in: CN.

"CN Application No. 200510081977.1 Office Action Mar. 16, 2007", , Publisher: SIPO, Published in: CN.

Liu Man, "CN Application No. 200510081977.1 Office Action Jun. 5, 2009", , Publisher: SIPO, Published in: CN.

Moreno-Solana S., "EP Application No. 05254334.5 Office Action Feb. 7, 2007", , Publisher: EPO, Published in: EP.

Moreno-Solana S., "EP Application No. 05254334.5 Office Action Jun. 8, 2006", , Publisher: EPO, Published in: EP.

Agarwal, Rajiv, "CA Application No. 2,511,639 Office Action Mar. 11, 2010", , Publisher: CIPO, Published in: CA.

Agarwal, Rajiv, "CA Application No. 2,511,639 Office Action Apr. 4, 2011", , Publisher: CIPO, Published in: CA.

\* cited by examiner

| User | Command | Neighbor | Perimeter | Condition | Output |
|---|---|---|---|---|---|
| grchen | store diagnosis | doctor | 12' circle | | |
| grchen | read diagnosis | 0 | room123 | | |
| nurse | read diagnosis | non-superior | room123 | | suppress time-to-live |
| nurse | read biopsy result | non-superior | 15' circle | | K4x encoding |
| grchen | read biopsy result | 0 | 15' circle | | |
| tbsmith | change vault password | 2 | 9' circle | rule2 | |
| ⋮ | | | | | |
| any | read balance | 0 | lobby | rule1 | |

302

| User | Content | Neighbor | Perimeter | Version |
|---|---|---|---|---|
| majjsmith | F16MaxSpeed | no clearance | closedArea35 | unclassified |
| majjsmith | F16MaxSpeed | secret clearance | closedArea35 | secret |
| majjsmith | F16MaxSpeed | none | closedArea35 | secret |
| ⋮ | | | | |
| majjsmith | F4MaxSpeed | none | closedArea14 | secret |

| Rule Name | Rule |
|---|---|
| rule1 | only if *balance < 100000* |
| rule2 | only mon-sat 7pm - 8pm |
| ⋮ | ⋮ |
| rule*n* | only mon-fri 8am - 6pm |

404

| Perimeter | Shape | Parameters |
|---|---|---|
| closedArea35 | polygon | {(0,0), (2,5), ... } |
| room123 | polygon | {(10,21), (10,36), ... } |
| ⋮ | ⋮ | ⋮ |
| lobby | circle | (0,0), 7.5 |

405

| Terminal I[ | x | y |
|---|---|---|
| cellphone142 | 2.56 | 31.4 |
| pdaX_45 | 0.54 | 12.32 |
| ⋮ | ⋮ | ⋮ |
| cameraphone563 | 10.97 | 10.61 |

PROXIMITY-BASED AUTHORIZATION

FIELD OF THE INVENTION

The present invention relates to telecommunications in general, and, more particularly, to techniques for intelligently responding to a command issued by the user of a wireless terminal.

BACKGROUND OF THE INVENTION

FIG. 1 depicts user 101-1 who is carrying wireless terminal 102-1 (e.g., a notebook computer, a mobile telephone, a personal digital assistant [PDA], etc.) in accordance with the prior art. Wireless terminal 102-1 wirelessly transmits signals to and receives signals from one or more wireless infrastructure nodes (e.g., a Code Division Multiple Access [CDMA] base station, an Institute of Electrical and Electronics Engineers [IEEE] 802.11 wireless access point, etc.). User 101-1 can move about and can enter commands into wireless terminal 102-1 via one or more input mechanisms (e.g., keypad input, pen-based input, voice input, etc.). Wireless terminal 102-1 also typically has one or more output devices (e.g., liquid-crystal display, speaker, etc.) to present content (e.g., a web page, an audio clip, output of an executed query, etc.) to user 101-1.

For the purposes of the specification and claims, a "local command" issued by a user is defined as a command that executes entirely on his or her wireless terminal and that does not involve communication with or execution on a remote device (e.g., a server, a wireless terminal other than terminal 102-1, etc.). Examples of local commands include adjusting the volume of the speaker of wireless terminal 102-1, editing information in a spreadsheet stored in disk memory in wireless terminal 102-1, playing a Chess game residing in random-access memory in wireless terminal 102-1, playing an audio clip stored on disk in wireless terminal 102-1, capturing an image with a digital camera embedded in wireless terminal 102-1, and capturing an acoustic signal with a microphone embedded in wireless terminal 102-1.

For the purposes of the specification and claims, a "request to access local content" is defined as a local command that involve accessing content stored on the user's wireless terminal (e.g., in random-access memory, in disk storage, etc.)

For the purposes of the specification and claims, a "remote command" issued by a user is a command issued through the user's wireless terminal that:
  (i) executes on a remote device (e.g., a server, a wireless terminal other than terminal 102-1, etc.), or
  (ii) accesses data stored at a remote device, or
  (iii) transmits data to a remote device, or
  (iv) performs any combination of (i), (ii), and (iii).

Examples of remote commands include downloading a web page, issuing a query that searches a database that is stored on another device, sending an email message, and placing a telephone call. Remote commands that satisfy condition (ii) (i.e., that access data stored at a remote device) are also known as requests to access remote content.

Some computing devices such as wireless terminals, desktop personal computers (PCs), and servers require a user to log in to the device before allowing the user to use the device. For example, when a personal computer (PC) that runs on the Windows XP or Linux operating system is powered on, the user is confronted with a log-in screen that asks for the user's username (also referred to as a screen name for Internet service providers such as AOL) and password. The user is can not proceed past the start-up screen until he or she provides a valid username and password combination.

Some computing devices provide, in addition to a log-in screen, one or more authorization mechanisms to restrict access to data, commands, or both. For example, PCs that run on the Windows XP or Linux operating system enable a data file to be associated with a particular user or group of users, thereby allowing only the associated user(s) to access the data file. In some authorization mechanisms, separate read- and write-permissions can be associated with a data file, thereby partitioning users into four categories: (i) those who can read and write to the data file, (ii) those who can read the data file but cannot write to it, (iii) those who can write to the data file but cannot read it, and (iv) those who can neither read nor write to the data file. Furthermore, some authorization mechanisms enable a command (such as an executable file) to be associated with a particular user or group of users, thereby allowing only the associated user(s) to execute the command.

The mechanism for restricting who can read, write, and execute a file is a great advantage in many practical situations, but it does not provide the flexibility and appropriateness necessary for many other situations. Therefore, the need exists for innovative restriction mechanisms.

SUMMARY OF THE INVENTION

In many situations, it would be advantageous if the execution of commands (e.g., files, etc.) and the reading and writing of files could be restricted not just on the identity of the user who is attempting it, but also on whether or not there are other people in the vicinity of that user. For example, it might be advantageous to prevent a hospital secretary from reading a patient's file unless the secretary is in the presence of either the patient or the patient's doctor, and it might be advantageous to prevent the secretary from writing into the patient's file unless the secretary is in the presence of either the patient's doctor or nurse.

As another example, it might be advantageous to prevent a bank employee from changing the password file for a vault unless: (i) the employee is in the presence of at least two other employees, and (ii) it is during normal business hours.

As yet another example, it might be advantageous to prevent a bank manager from reading payroll information on his or her wireless terminal when there are other people nearby. As yet another example, when a teller deposits a check into a depositor's account, it might be desirable to display the new balance only when there are no other people nearby, and instead display "Deposit confirmed" when there are people nearby. Alternatively, instead of the "Deposit confirmed" message, an encoded version of the balance might be displayed that enables only the teller to know the new balance.

It might be advantageous to provide a user who is accessing content (e.g., a news article, a web page, etc.) via his or her wireless terminal as text when people are nearby (e.g., within hearing range, etc.) but acoustically when there are not. This prevents people who are near from (i) overhearing the content, and (ii) being disturbed by noise.

As another example, some military data might have both classified and unclassified versions. In this case it might be advantageous to provide an authorized user the classified version when no other people are nearby and the unclassified version when other people are nearby.

The present invention enables the response to a remote command from a wireless terminal to be based on the presence or absence of other people near the wireless terminal. Furthermore, in some embodiments of the present invention, the response is also based on the identity of the people in the vicinity of the wireless terminal.

In accordance with the illustrated embodiment, all of the people within an area (e.g., a hospital, an office building, a campus, a home, a city, etc.) carry at least one wireless terminal that is associated with them. This enables the presence—and identity—of a person to be inferred from the presence—and identity—of their wireless terminal. The presence of a wireless terminal is determined in accordance with well-known wireless location techniques (e.g., time-difference of arrival, angle-of-arrival, Global Positioning System [GPS], signal-strength measurements, etc.). The location of wireline terminals can be determined by using a map or with Global Positioning System (GPS) or through any one of many other well-known methods.

A server maintains a list of the locations of each wireline and wireless terminals within the area. When a user issues a command (either remote or local) to his or her wireless terminal, the command is relayed to the server. The server then determines whether there are any other nearby people nearby (inferentially, through the presence of wireless terminals), and then determines whether the command is authorized in the presence of those people.

The server then either executes the command or arranges to have the command executed or transmits a message (e.g., a text string, synthesized speech, etc.) back to the wireless terminal that indicates that the command cannot be executed and why.

When the server executes the remote command and the execution results in one or more products (e.g., a result value, etc.), the server also determines whether to suppress or encode one or more of these products based on the presence or absence—and identity—of nearby users. The server then transmits any unsuppressed products (both unchanged and encoded) to the wireless terminal that issued the remote command.

If the command is a local command, in some embodiments of the present invention the server transmits back to the wireless terminal an indication of whether the local command is authorized, and the terminal proceeds accordingly. In some other embodiments, the server transmits information about nearby users to the wireless terminal, and the terminal itself determines whether to execute the command based on this information.

In some embodiments of the present invention, when the server determines that a wireless terminal is authorized to execute a local command, and executing the local command results in one or more products, the server might also determine, based on the presence or absence of nearby users, whether the terminal should suppress or encode any of these products. In some other embodiments, the wireless terminal might determine whether any products that result from executing the local command should be suppressed or encoded.

In the illustrative embodiment of the present invention, determining whether users are "nearby" is based on a perimeter surrounding the wireless terminal (e.g., a circle with a six-foot radius centered at the terminal, a room, etc.). In some embodiments, the response to the command is also at least partially based on one or more additional factors, such as the identity of the user of the wireless terminal, the nature of the command (e.g., a query, a command to store data, a command to place a call, a command to transmit data, etc.), one or more arguments of a command (e.g., a filename, a command option, etc.), the value of a datum retrieved by a query, the date and time [i.e., "calendrical time"], etc.

The illustrative embodiment comprises: (a) receiving from a first wireless terminal a remote command issued by a first user; and (b) refusing to execute the remote command when there is a second wireless terminal that is associated with a second user and is inside a perimeter that also contains the first wireless terminal.

BRIEF DESCRIPTION OF THE DRAWINGS

FIG. 3 depicts two tables for an exemplary organization of information in database 205, as shown in FIG. 2, in accordance with the illustrative embodiment of the present invention.

FIG. 4 depicts three additional tables for the exemplary organization of information in database 205, as shown in FIG. 2, in accordance with the illustrative embodiment of the present invention.

DETAILED DESCRIPTION

For the purposes of the specification and claims, the term "calendrical time" is defined as indicative of one or more of the following:

(i) a time (e.g., 16:23:58, etc.), (ii) one or more temporal designations (e.g., Tuesday, November, etc.), (iii) one or more events (e.g., Thanksgiving, John's birthday, etc.), and (iv) a time span (e.g., 8:00-9:00, etc.).

For the purposes of the specification and claims, the term "local command" is defined as a command issued by the user of a wireless terminal that is executed at the terminal and does not involve communication with any remote device.

For the purposes of the specification and claims, the term "request to access local content" is a local command issued by the user of a wireless terminal that accesses only content stored at the wireless terminal.

For the purposes of the specification and claims, the term "remote command" is defined as a command issued by the user of a wireless terminal that (i) executes on a remote device (e.g., a server, another wireless terminal, etc.), (ii) accesses data stored at a remote device, (iii) transmits data to a remote device, or (iv) any combination of (i) through (iii).

For the purposes of the specification and claims, the term "request to access remote content" is a remote command that satisfies condition (ii) (i.e., that accesses content stored at a remote device).

For the purposes of the specification and claims, the term "command," without a modifier, is used when context renders the issue of local versus remote unambiguous. For example, "transmitting a command from a wireless terminal to a server" refers to a remote command, and "receiving a command at a terminal and executing the command at the terminal" refers to a local command.

For the purposes of the specification and claims, the term "request to access content," without a modifier, is used when context renders the issue of local versus remote unambiguous. For example, "transmitting a request to access content from a wireless terminal to a server" refers to a request to access remote content, and "receiving a request to access content at a terminal and accessing the content at that terminal" refers to a request to access local content.

Figure 1:
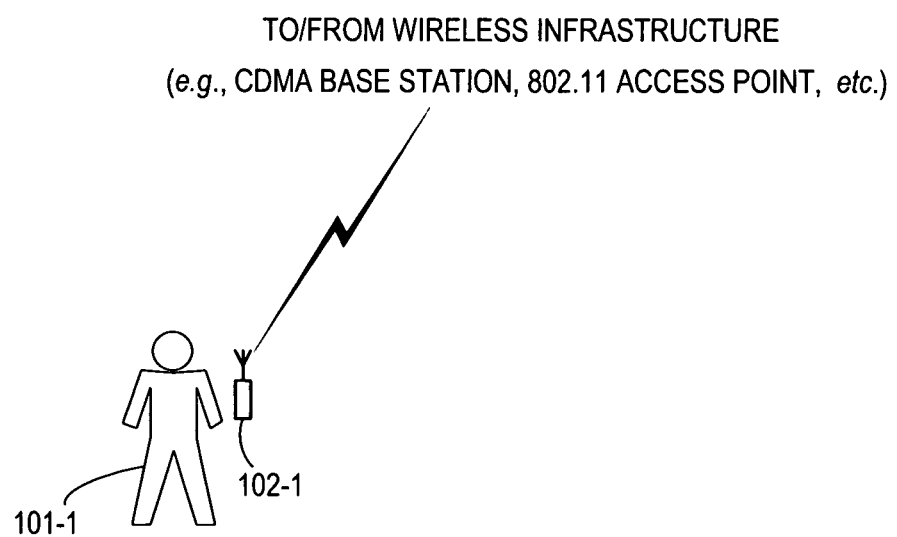
FIG. 1 depicts a user carrying a wireless terminal in the prior art.
Figure 2:
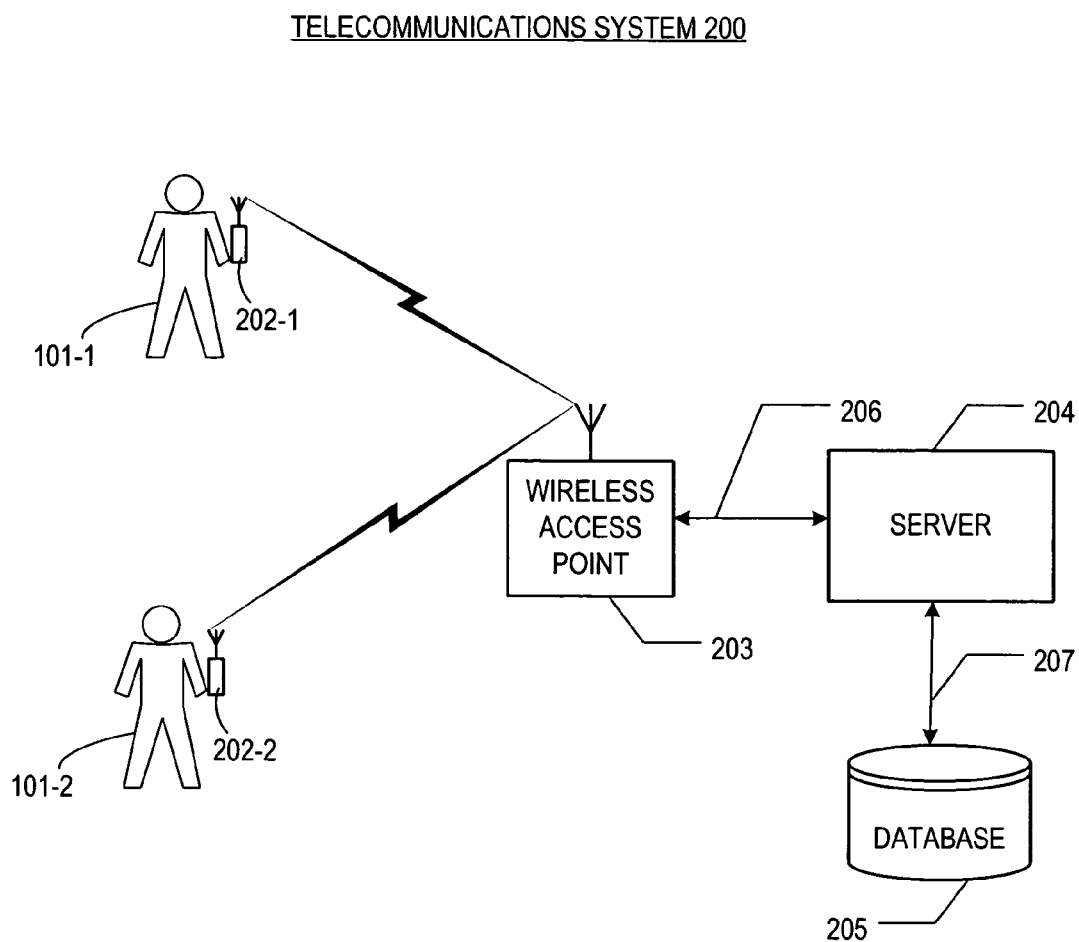
FIG. 2 depicts the salient components of telecommunications system 200, in accordance with the illustrative embodiment of the present invention.

FIG. 2 depicts the salient components of telecommunications system 200 in accordance with the illustrative embodiment of the present invention. As shown in FIG. 2, telecommunications system 200 comprises wireless terminal 202-1, wireless terminal 202-2, wireless access point 203, server 204, and database 205, interconnected as shown. As will be appreciated by those skilled in the art, in some embodiments wireless access point 203 might be replaced with a cellular (e.g., CDMA, GSM, etc.) base station and might be located several miles away from wireless terminals 202-1 and 202-2.

Each wireless terminal 202-$i$, where i equals 1 or 2, wirelessly transmits signals to and receives signals from wireless access point 203 in well-known fashion. In addition, wireless terminal 202-$i$ has one or more input mechanisms (e.g., keypad input, pen-based input, voice input, etc.) through which user 101-$i$ can enter local and remote commands, as is well-known in the art. As will be appreciated by those skilled in the art, in some embodiments wireless terminal 202-$i$ might operate in accordance with a local-area network protocol (e.g., IEEE 802.11 ["Wi-Fi"], etc.), while in some embodiments wireless terminal 202-$i$ might operate in accordance with a metropolitan-area network protocol (e.g., IEEE 802.16 ["Wi-Max"], etc.). It will be clear to those skilled in the art, after reading this disclosure, how to make and use wireless terminal 202-$i$.

Wireless access point 203 wirelessly transmits signals to and receives signals from wireless terminals 202-$i$, and possibly other wireless terminals, in well-known fashion. As will be appreciated by those skilled in the art, in some embodiments wireless access point 203 might operate in accordance with a local-area network protocol (e.g., IEEE 802.11 ["Wi-Fi"], etc.), while in some embodiments wireless access point 203 might operate in accordance with a metropolitan-area network protocol (e.g., IEEE 802.16 ["Wi-Max"], etc.). It will be clear to those skilled in the art, after reading this disclosure, how to make and use wireless access point 203.

Server 204 is a computer that receives requests from client devices and performs one or more computing tasks in response to these requests, as is well-known in the art. As shown in FIG. 2, server 204 sends signals to and receives signals from (i) wireless access point 203 via wired connection 206, and (ii) database 205 via wired connection 207, in well-known fashion. It will be clear to those skilled in the art, after reading this disclosure, how to make and use server 204.

Database 205 stores information for a plurality of users, a plurality of commands, and a plurality of geographic perimeters (e.g., rooms, etc.), where the information indicates whether particular users are authorized to execute particular commands based on the presence or absence of nearby users, and if so authorized, whether one or more products of a command should be suppressed or encoded, as described above. Database 205 also classifies users into a hierarchy of groups (e.g., nurses, doctors, etc.) and employs rules based on this hierarchy to determine whether commands are authorized, as described below. In addition, database 205 stores the current locations of wireless terminals 202-$i$ and geometric information for defining perimeters.

FIG. 3 depicts two tables for an exemplary organization of information in database 205, in accordance with the illustrative embodiment of the present invention.

As shown in FIG. 3, database 205 comprises command authorization table 301 and content version table 302.

Command authorization table 301 contains a "whitelist" of authorized commands for various combinations of user, nearby users (i.e., "neighbors"), and perimeter. If a particular combination is not in command authorization table 301, then that combination is not authorized. (As will be appreciated by those skilled in the art, in some embodiments it might be advantageous to instead use a "blacklist" that enumerates the unauthorized combinations in command authorization table 301.) Command authorization table 301 also indicates, when appropriate, whether any particular products of the command should be suppressed or encoded, as described above.

As shown in FIG. 3, an entry for field "user" can be an individual user identifier, a user group (e.g., nurse, etc.), or "any", which applies to all users. An entry for field "neighbor" can be: (i) a non-negative integer, indicating the number of neighbors that must be present for the command to be authorized; (ii) a user group (e.g., doctor, etc.); or (iii) a relation between the ranks of the user and a neighbor (e.g., superior, non-superior, same, inferior, non-inferior, etc.). In addition, some entries of command authorization table 301 might be associated with a conditional rule in rule list 403, described below and with respect to FIG. 4.

Content version table 302 indicates which version of content is accessible for particular combinations of user/content/perimeter/neighbor. For example, the third row of content version table 302 in FIG. 4 indicates that when user MajJ-Smith accesses content F16MaxSpeed, he gets the classified version when there are no other users inside perimeter closedArea35.

FIG. 4 depicts three additional tables for the exemplary organization of information in database 205, in accordance with the illustrative embodiment of the present invention. As shown in FIG. 4, database 205 also comprises rule list 403, geometric information table 404, and terminal location table 405.

Each entry in rule list 403 contains one or more conditions that must be true in order for an associated command in command authorization table 301 to be authorized. For example, for a command that accesses the value associated with a descriptor (e.g., the value associated with descriptor "balance" for a particular depositor, etc.), rule list 403 might have a rule that determines authorization based on the particular value stored (e.g., balance<100000, etc.), or the descriptor itself, or both. In addition, an entry of rule list 403 might contain a necessary condition concerning the calendrical time at which a user entered the command, as shown in FIG. 4 for rule2 and rulen. As will be appreciated by those skilled in the art, an entry of rule list 403 might contain, in addition to or instead of the necessary conditions described above, conditions based on alternative information.

As will be appreciated by those skilled in the art, in some embodiments the authorization information in some or all of tables 301, 302, and 303 might be provided by a system administrator or by the users of wireless terminals 202, while in some other embodiments, this information might be extracted from a set of business rules. As will be further appreciated by those skilled in the art, in some embodiments the entries in some or all of tables 301, 302, and 303 might be static, while in some other embodiments, these entries might be dynamic based on an algorithm, a particular event, calendrical time, etc.

Geometric information table 404 defines the perimeters referenced in command authorization table 301 and content version table 302. As shown in FIG. 4, a perimeter might be a polygon defined by an ordered list of vertices, a circle defined by its center and radius, etc. As will be appreciated by those skilled in the art, a perimeter associated with a particular entry in command authorization table 301 or content version table 302 might represent a particular room with limited access, a minimum amount of privacy or "breathing room" for a user, etc.

Terminal location table 405 stores the current locations of wireless terminals 202. In the illustrative embodiment, the location of a terminal is represented in two-dimensional Cartesian coordinates (i.e., (x, y)). As will be appreciated by those skilled in the art, in some embodiments locations might be stored differently (e.g., latitude/longitude, three-dimensional Cartesian coordinates, latitude/longitude/elevation, etc.)

As will also be appreciated by those skilled in the art, in some embodiments database 205 might also include information that classifies users into a hierarchy of groups (e.g., nurses, doctors, etc.) and might encode authorization information in database 205 with respect to these groups as well as with respect to individual users. In addition, in some embodiments database 205 might reside in a database server that is separate from server 204, while in some other embodiments database 205 might be stored in server 204 itself. It will be clear to those skilled in the art, after reading this disclosure, how to make and use database 205.

Figure 5:
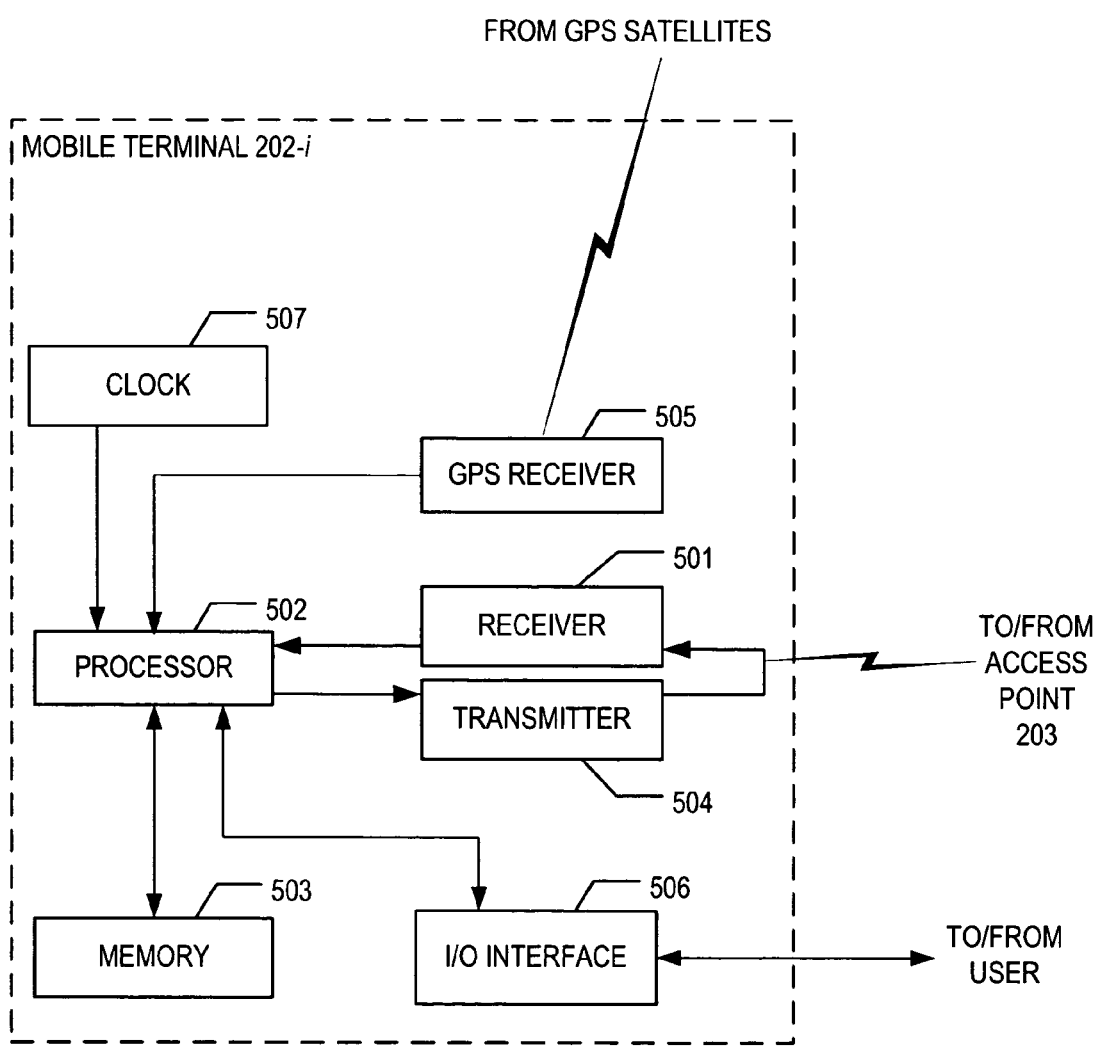
FIG. 5 depicts a block diagram of the salient components of wireless terminal 202-$i$, as shown in FIG. 2, in accordance with the illustrative embodiment of the present invention.

FIG. 5 depicts a block diagram of the salient components of wireless terminal 202-$i$ in accordance with the illustrative embodiment of the present invention. As shown in FIG. 5, wireless terminal 202-$i$ comprises receiver 501, processor 502, memory 503, transmitter 504, GPS receiver 505, input/output interface 506, and clock 507, interconnected as shown.

Receiver 501 receives signals wirelessly from wireless access point 203 and forwards the information encoded in these signals to processor 502, in well-known fashion. It will be clear to those skilled in the art, after reading this disclosure, how to make and use receiver 501.

Processor 502 is a general-purpose processor that is capable of executing instructions stored in memory 503, of reading data from and writing data into memory 503, of receiving location information from Global Positioning System (GPS) receiver 505, of receiving information from receiver 501, of transferring information to transmitter 504, and of executing the tasks described below and with respect to FIG. 8 and FIGS. 10 through 15. In some alternative embodiments of the present invention, processor 502 might be a special-purpose processor. In either case, it will be clear to those skilled in the art, after reading this disclosure, how to make and use processor 502.

Memory 503 stores data and executable instructions, as is well-known in the art, and might be any combination of random-access memory (RAM), flash memory, disk drive, etc. In some embodiments, some or all of tables 301 through 404 might be stored in memory 503 instead of, or in addition to, database 205. It will be clear to those skilled in the art, after reading this disclosure, how to make and use memory 503.

Transmitter 504 receives information from processor 502 and wirelessly transmits signals that encode this information to wireless access point 203, in well-known fashion. In the illustrative embodiment, transmitter 504 continually receives updated location information from processor 502 and transmits this information to wireless access point 203. It will be clear to those skilled in the art, after reading this disclosure, how to make and use transmitter 504.

Global Positioning System (GPS) receiver 505 receives satellite-based signals and determines location, as is well understood in the art, and forwards the location to processor 502. It will be clear to those skilled in the art that some embodiments might employ means other than satellite-based signals for determining location (e.g., triangulation, radio beacons, radio-frequency fingerprinting [U.S. Pat. No. 6,393, 294, incorporated by reference], etc.) In such embodiments, an appropriate receiver (e.g., radio-frequency receiver, etc.) would be substituted for GPS receiver 505, as is well understood in the art.

Input/output interface 506 (i) receives input signals from the user of wireless terminal 202-$i$ and forwards corresponding signals to processor 502, and (ii) receives signals from processor 502 and emits corresponding output signals that can be sensed by the user, in well-known fashion. As will be appreciated by those skilled in the art, the input mechanism of input/output interface 506 might be a keypad, touchscreen, microphone, etc., and the output mechanism of input/output interface 506 might be a liquid-crystal display (LCD), speaker, etc.

Clock 507 transmits the current time, date, and day of the week to processor 502 in well-known fashion.

Figure 6:
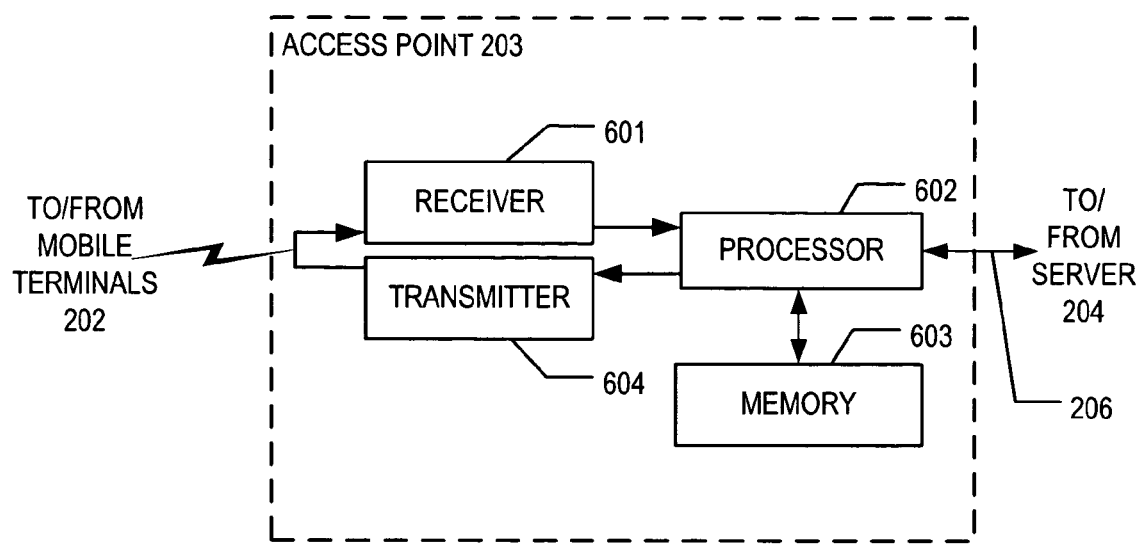
FIG. 6 depicts a block diagram of the salient components of wireless access point 203, as shown in FIG. 2, in accordance with the illustrative embodiment of the present invention.

FIG. 6 depicts a block diagram of the salient components of wireless access point 203 in accordance with the illustrative embodiment of the present invention. As shown in FIG. 6, wireless access point 203 comprises receiver 601, processor 602, memory 603, and transmitter 604, interconnected as shown.

Receiver 601 receives signals wirelessly from wireless terminal 202-$i$, and possibly other wireless terminals, and forwards the information encoded in these signals to processor 602, in well-known fashion. It will be clear to those skilled in the art, after reading this disclosure, how to make and use receiver 601.

Processor 602 is a general-purpose processor that is capable of executing instructions stored in memory 603, of reading data from and writing data into memory 603, of forwarding information received from wireless terminal 202-*i* (via receiver 601) to server 204, of receiving information from server 204, and of transmitting (via transmitter 604) information received from server 204 to wireless terminal 202-*i*. In some alternative embodiments of the present invention, processor 602 might be a special-purpose processor. In either case, it will be clear to those skilled in the art, after reading this disclosure, how to make and use processor 602.

Memory 603 stores data and executable instructions, as is well-known in the art, and might be any combination of random-access memory (RAM), flash memory, disk drive, etc. It will be clear to those skilled in the art, after reading this disclosure, how to make and use memory 603.

Transmitter 604 receives information from processor 602 and wirelessly transmits signals that encode this information to wireless terminal 202-*i*, in well-known fashion. It will be clear to those skilled in the art, after reading this disclosure, how to make and use transmitter 604.

Figure 7:
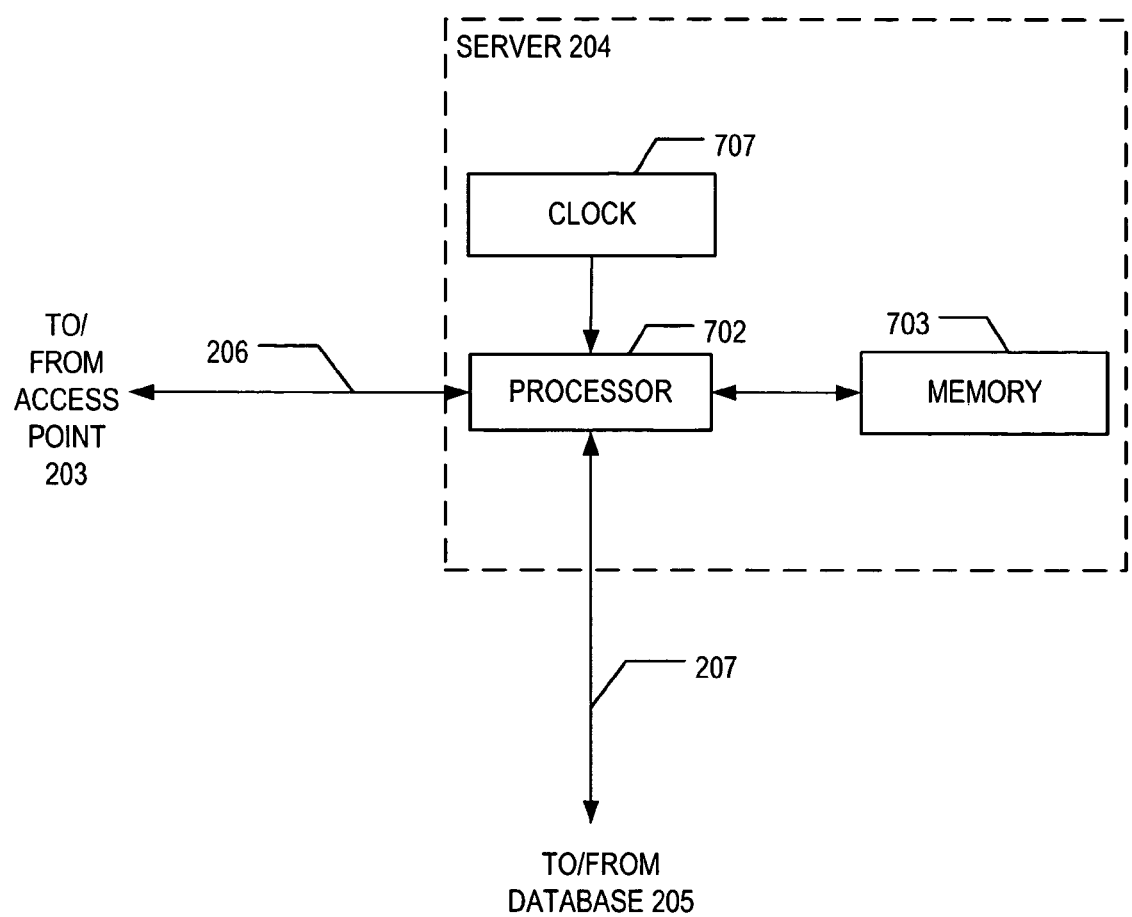
FIG. 7 depicts a block diagram of the salient components of server 204, as shown in FIG. 2, in accordance with the illustrative embodiment of the present invention.

FIG. 7 depicts a block diagram of the salient components of server 204 in accordance with the illustrative embodiment of the present invention. As shown in FIG. 7, server 204 comprises processor 702, memory 703, and clock 707, interconnected as shown.

Processor 702 is a general-purpose processor that is capable of executing instructions stored in memory 703, of reading data from and writing data into memory 703, of transferring information to and from wireless access point 203, and of executing the tasks described below and with respect to FIGS. 8 through 10 and FIGS. 12 through 15. Processor 702 receives location information from wireless access point 203, and stores the locations of wireless terminals 202 in table 405 of database 205. As will be appreciated by those skilled in the art, processor 702 might perform some computations before storing a location in table 405 (e.g., transforming latitude/longitude to Cartesian coordinates, etc.); in addition, table 405 might be stored in memory 703 instead of, or in addition to, database 205.

In some alternative embodiments of the present invention, processor 702 might be a special-purpose processor instead of a general-purpose processor. In either case, it will be clear to those skilled in the art, after reading this disclosure, how to make and use processor 702.

Memory 703 stores data and executable instructions, as is well-known in the art, and might be any combination of random-access memory (RAM), flash memory, disk drive, etc. In some embodiments, some or all of tables 301 through 405 might be stored in memory 703 instead of, or in addition to, database 205. It will be clear to those skilled in the art, after reading this disclosure, how to make and use memory 703.

Clock 707 transmits the current time, date, and day of the week to processor 702 in well-known fashion.

Figure 8:
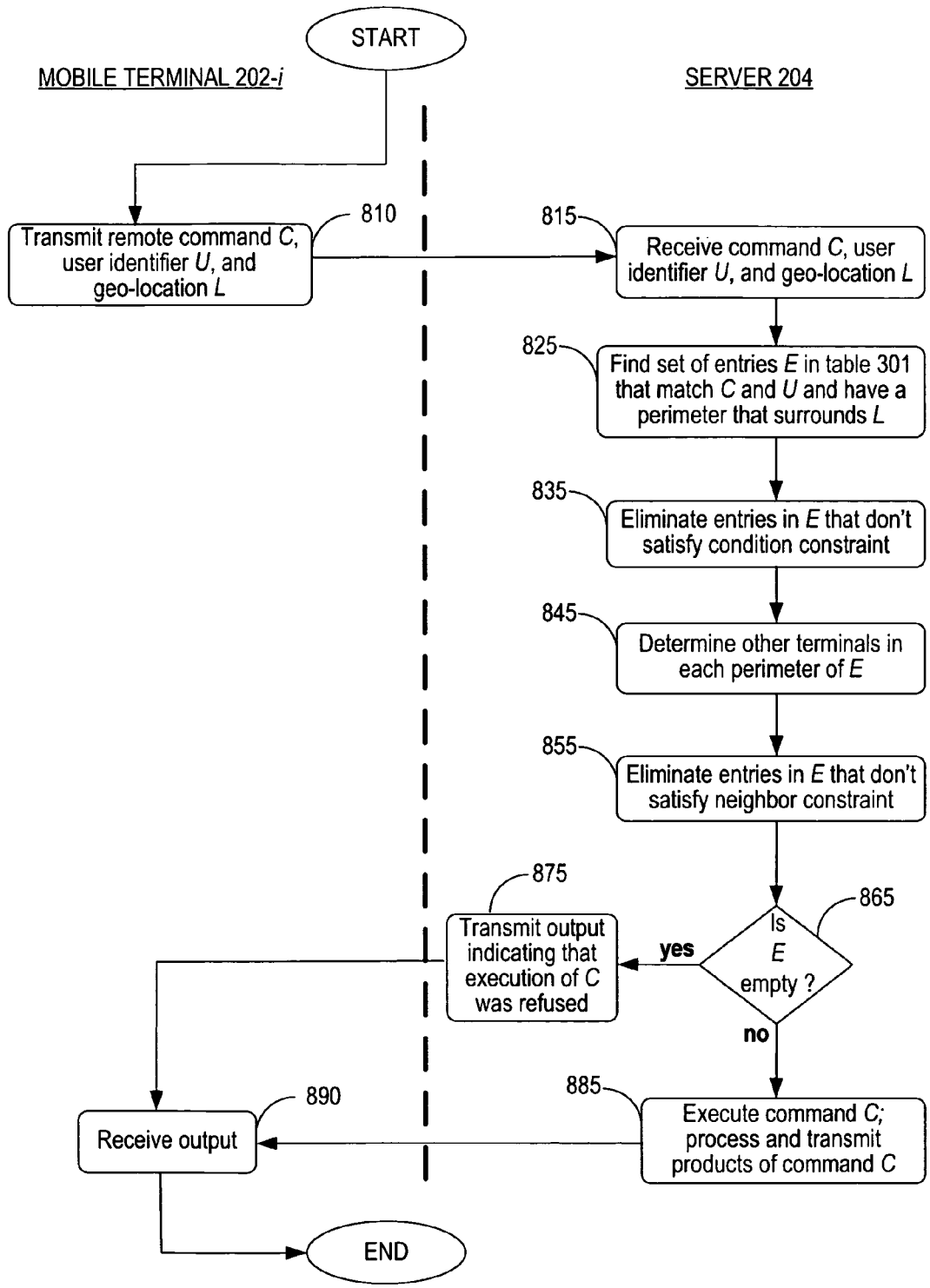
FIG. 8 depicts a flowchart of the operation of wireless terminal 202-$i$ and server 204 in response to a remote command input at wireless terminal 202-$i$, in accordance with the illustrative embodiment of the present invention.

FIG. 8 depicts the operation of wireless terminal 202-*i* and server 204 in response to a remote command input at wireless terminal 202-*i*, in accordance with the illustrative embodiment of the present invention. It will be clear to those skilled in the art which tasks depicted in FIG. 8 can be performed simultaneously or in a different order than that depicted.

At task 810, wireless terminal 202-*i* transmits to server 204, via wireless access point 203: (i) a remote command C that was input by the user of wireless terminal 202-*i*, (ii) an identifier U that indicates the user of wireless terminal 202-*i* (e.g., a username, etc.), and (iii) the location L of wireless terminal 202-*i*, in well-known fashion. In some embodiments in which wireless terminal 202-*i* is used by a single user only, the identifier might indicate the terminal itself, while in embodiments in which different users might use wireless terminal 202-*i*, the user could identify himself or herself by initially logging in to the terminal, or by inserting a personalized Single In-line Memory Module (SIMM) card into a memory slot of wireless terminal 202-*i*, etc.

At task 815, server 204 receives, via wireless access point 203, remote command C, identifier U, and location L, in well-known fashion.

At task 825, server 204 searches table 301 and determines which entries in the table (i) match remote command C, (ii) match user identifier U, and (iii) have a perimeter that surrounds location L. It is well-known in the art how to determine if a point (i.e., location L) is inside a polygon, circle, etc. The set of entries in table 302 that match all three criteria are stored in variable E; if there are no matching entries, E =φ.

At task 835, processor 702 of server 204 checks for each entry of set E whether there is a rule in the entry's "condition" field. If there is no condition, the entry is retained in set E; otherwise, the entry is retained in set E only if the corresponding rule in table 403 evaluates to true.

At task 845, processor 702 consults terminal location table 405 and determines which wireless terminals 202 are inside which perimeter of entry set E. It is well-known in the art how to determine the locations inside a perimeter, from "naïve" approaches that test each individual location and perimeter combination, to more efficient approaches that rely on data structures and algorithms based on computational geometry.

At task 855, processor 702 eliminates any entries of set E for which the results of task 845 do not satisfy the "neighbor" field, in well-known fashion.

At task 865, processor 702 checks whether set E is empty after executing tasks 825 through 855; if so, execution proceeds to task 875, otherwise execution continues at task 885.

At task 875, processor 702 transmits to wireless terminal 202-*i*, via wireless access point 203, an output signal that indicates that the execution of remote command C was refused. After completion of task 875, execution ends at server 204 and continues at wireless terminal 202-*i* at task 890.

At task 885, processor 702 (i) executes remote command C, (ii) processes any products of command C as necessary, and (iii) transmits the appropriate products to wireless terminal 202-*i* via wireless access point 203. Subtasks (ii) and (iii) of task 885 are described in detail below and with respect to FIG. 9. After completion of task 885, execution ends at server 204 and continues at wireless terminal 202-*i* at task 890.

At task 890, receiver 501 of wireless terminal 202-*i* receives, via wireless access point 203, output from server 204 in well-known fashion. After task 890 the method of FIG. 8 terminates.

Figure 9:
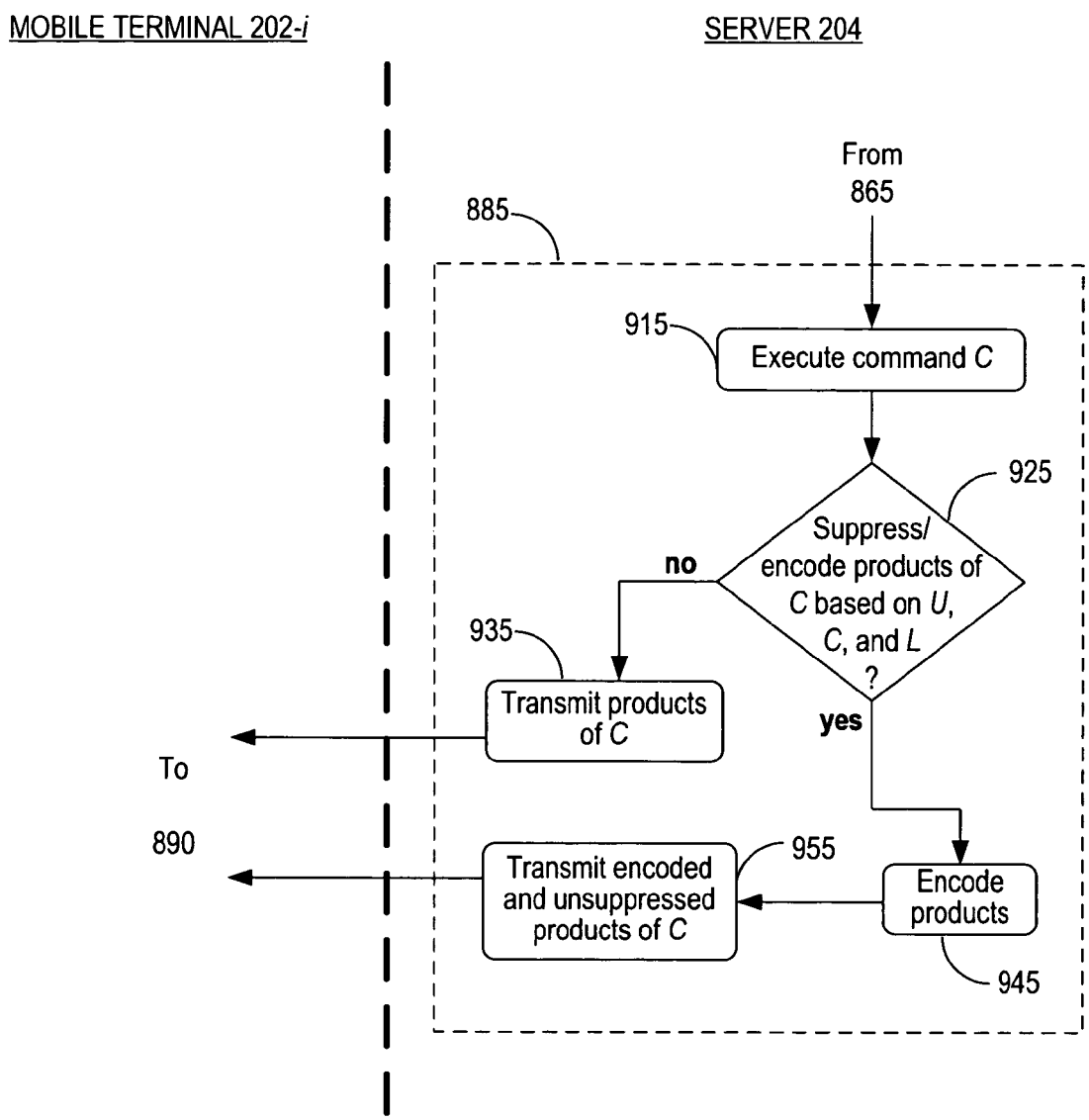
FIG. 9 depicts a flowchart of task 885, as shown in FIG. 8, in greater detail in accordance with the illustrative embodiment of the present invention.

FIG. 9 depicts a flowchart of task 885 in greater detail in accordance with the illustrative embodiment of the present invention. It will be clear to those skilled in the art which tasks depicted in FIG. 9 can be performed simultaneously or in a different order than that depicted.

At task 915, processor 702 of server 204 executes remote command C, in well-known fashion.

At task 925, server 204 consults the "output" field of the pertinent entry of table 301 to determine whether any products of remote command C should be suppressed or encoded. If processor 702 determines that no products should be suppressed or encoded, execution continues at task 935; otherwise execution proceeds to task 945.

At task 935, server 204 transmits to wireless terminal 202-*i*, via wireless access point 203, the products of remote command C, in well-known fashion. After completion of task 935, wireless terminal 202-*i* executes task 890, as shown in FIG. 8.

At task 945, processor 702 of server 204 encodes the appropriate products of remote command C as indicated by the "output" field, in well-known fashion. After completion of task 945, execution continues at task 955.

At task 955, server 204 transmits to wireless terminal 202-i, via wireless access point 203, unsuppressed products of remote command C (both encoded and un-encoded), in well-known fashion. After completion of task 955, wireless terminal 202-i executes task 890, as shown in FIG. 8.

Figure 10:
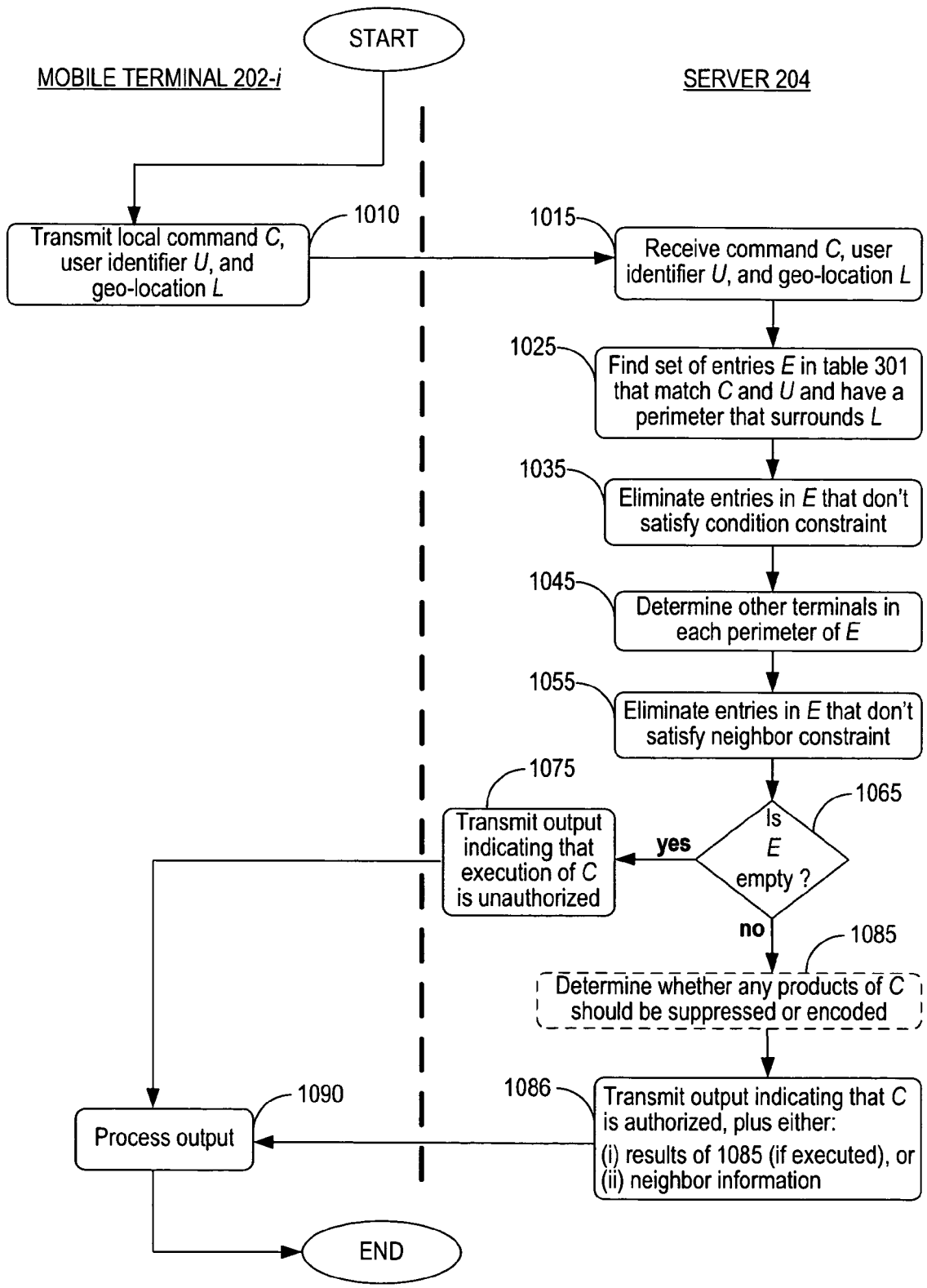
FIG. 10 depicts a first flowchart of the operation of wireless terminal 202-$i$ and server 204 in response to a local command input at wireless terminal 202-$i$, in accordance with the illustrative embodiment of the present invention.

FIG. 10 depicts a first flowchart of the operation of wireless terminal 202-i and server 204 in response to a local command input at wireless terminal 202-i, in accordance with the illustrative embodiment of the present invention. This first flowchart corresponds to embodiments in which the logic for determining whether a local command is authorized is performed by server 204. It will be clear to those skilled in the art which tasks depicted in FIG. 10 can be performed simultaneously or in a different order than that depicted.

At task 1010, wireless terminal 202-i transmits to server 204, via wireless access point 203: (i) a local command C that was input by the user of wireless terminal 202-i, (ii) an identifier U that indicates the user of wireless terminal 202-i (e.g., a username, etc.), and (iii) the location L of wireless terminal 202-i, in well-known fashion. In some embodiments in which wireless terminal 202-i is used by a single user only, the identifier might indicate the terminal itself, while in embodiments in which different users might use wireless terminal 202-i, the user could identify himself or herself by initially logging in to the terminal, or by inserting a personalized Single In-line Memory Module (SIMM) card into a memory slot of wireless terminal 202-i, etc.

At task 1015, server 204 receives, via wireless access point 203, local command C, identifier U, and location L, in well-known fashion.

At task 1025, server 204 searches table 301 and determines which entries in the table (i) match remote command C, (ii) match user identifier U, and (iii) have a perimeter that surrounds location L. It is well-known in the art how to determine if a point (i.e., location L) is inside a polygon, circle, etc. The set of entries in table 301 that match all three criteria are stored in variable E; if there are no matching entries, E=φ.

At task 1035, processor 702 of server 204 checks for each entry of set E whether there is a rule in the entry's "condition" field. If there is no condition, the entry is retained in set E; otherwise, the entry is retained in set E only if the corresponding rule in table 403 evaluates to true.

At task 1045, processor 702 consults terminal location table 405 and determines which wireless terminals 202 are inside which perimeter of entry set E. It is well-known in the art how to determine the locations inside a perimeter, from "naïve" approaches that test each individual location and perimeter combination, to more efficient approaches that rely on data structures and algorithms based on computational geometry.

At task 1055, processor 702 eliminates any entries of set E for which the results of task 845 do not satisfy the "neighbor" field, in well-known fashion.

At task 1065, processor 702 checks whether set E is empty after executing tasks 825 through 855; if so, execution proceeds to task 1075, otherwise execution continues at task 1085.

At task 1075, processor 702 transmits to wireless terminal 202-i, via wireless access point 203, an output signal that indicates that execution of local command C is unauthorized. After completion of task 1075, execution ends at server 204 and continues at wireless terminal 202-i at task 1090.

At optional task 1085, processor 702 consults the "output" field of the pertinent entry of table 301 to determine whether any products of remote command C should be suppressed or encoded. In some embodiments, task 1085 might not be performed, and instead, wireless terminal 202-i determines whether to suppress or encode any products of remote command C, as is described below and with respect to FIG. 11.

At task 1086, server 703 transmits to wireless terminal 202-i, via wireless access point 203, an output signal that indicates that execution of local command C is authorized. If optional task 1085 was executed, then the output signal also provides the results of task 1085. Otherwise, the output signal provides information on neighboring terminals, thereby enabling wireless terminal 202-i to determine whether to suppress or encode any products of remote command C, as described below and with respect to FIG. 11.

At task 1090, receiver 501 of wireless terminal 202-i receives, via wireless access point 203, output from server 204 in well-known fashion, and processor 502 of wireless terminal 202-i processes the output accordingly. Processor 502's processing of the output is described in detail below and with respect to FIG. 11. After task 1090 the method of FIG. 10 terminates.

Figure 11:
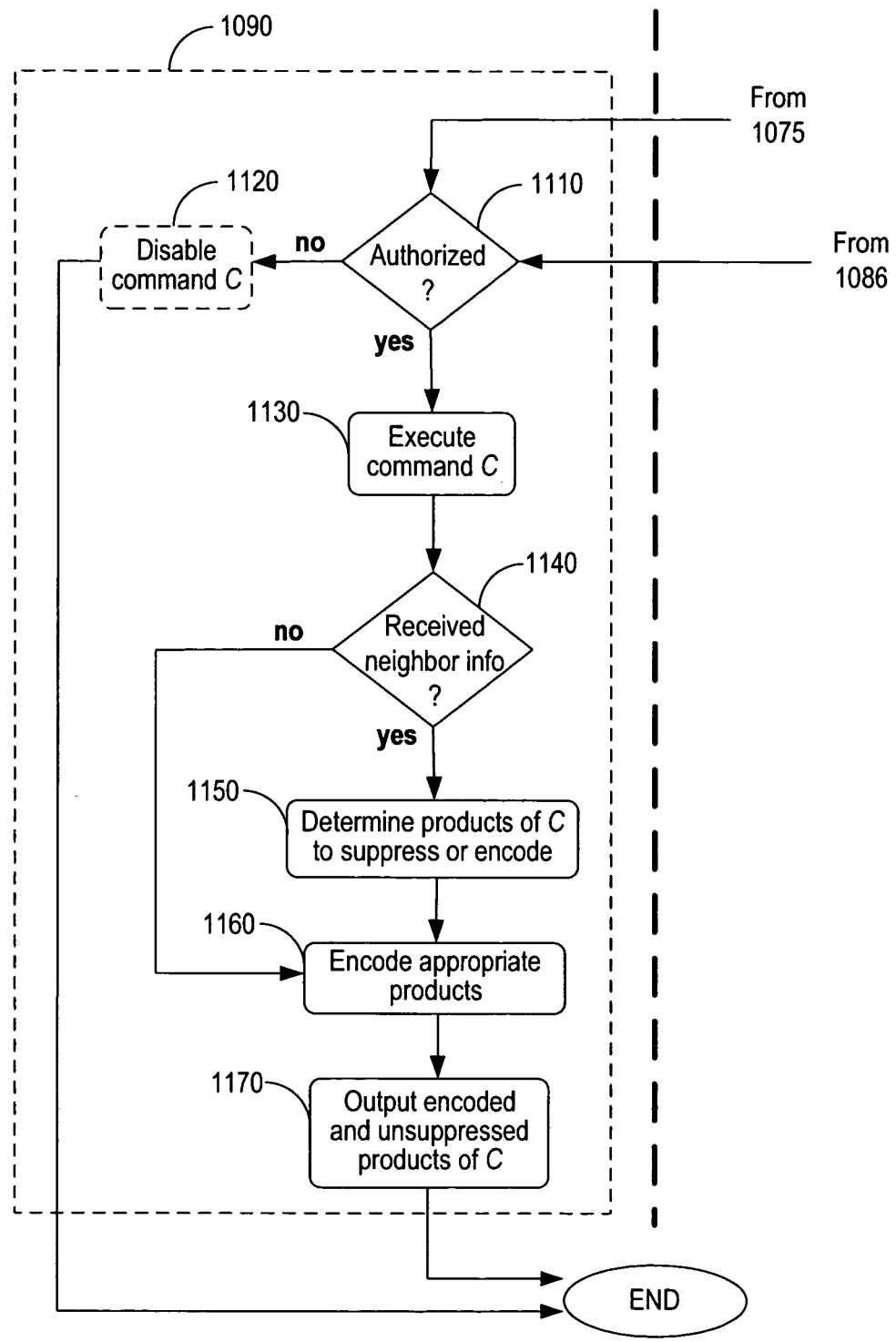
FIG. 11 depicts a flowchart of task 1090, as shown in FIG. 10, in greater detail in accordance with the illustrative embodiment of the present invention.

FIG. 11 depicts a flowchart of task 1090, as shown in FIG. 10, in greater detail in accordance with the illustrative embodiment of the present invention.

At task 1110, processor 502 of wireless terminal 202-i checks whether the output from server 204 authorizes execution of local command C; if not, execution proceeds to optional task 1120, otherwise execution continues at task 1130.

At optional task 1120, processor 502 temporarily disables local command C, in well-known fashion, thereby preventing the user from attempting to execute command C again. In some embodiments, this might be desirable in order to prevent unnecessary wireless traffic associated with repeated failed attempts to execute command C, while in some other embodiments, it might not be desirable to perform task 1120. After task 1120, task 1090 and the method of FIG. 10 terminate.

At task 1130, processor 502 executes local command C, in well-known fashion.

At task 1140, processor 502 checks the output received from server 204 for information on neighboring terminals. If there is no such information, execution continues at task 1160, otherwise execution proceeds to task 1150.

At task 1150, processor 502 determines, based on the neighboring terminal information, which products of command C, if any, should be suppressed or encoded.

At task 1160, processor 502 encodes the appropriate products of command C based on either the results of task 1150 or the output received from server 204, accordingly.

At task 1170, processor 502 outputs the unsuppressed products of command C (both encoded and un-encoded) to input/output interface 506 for presentation (e.g., display, etc.) to the user. After task 1170, task 1090 and the method of FIG. 10 terminate.

Figure 12:
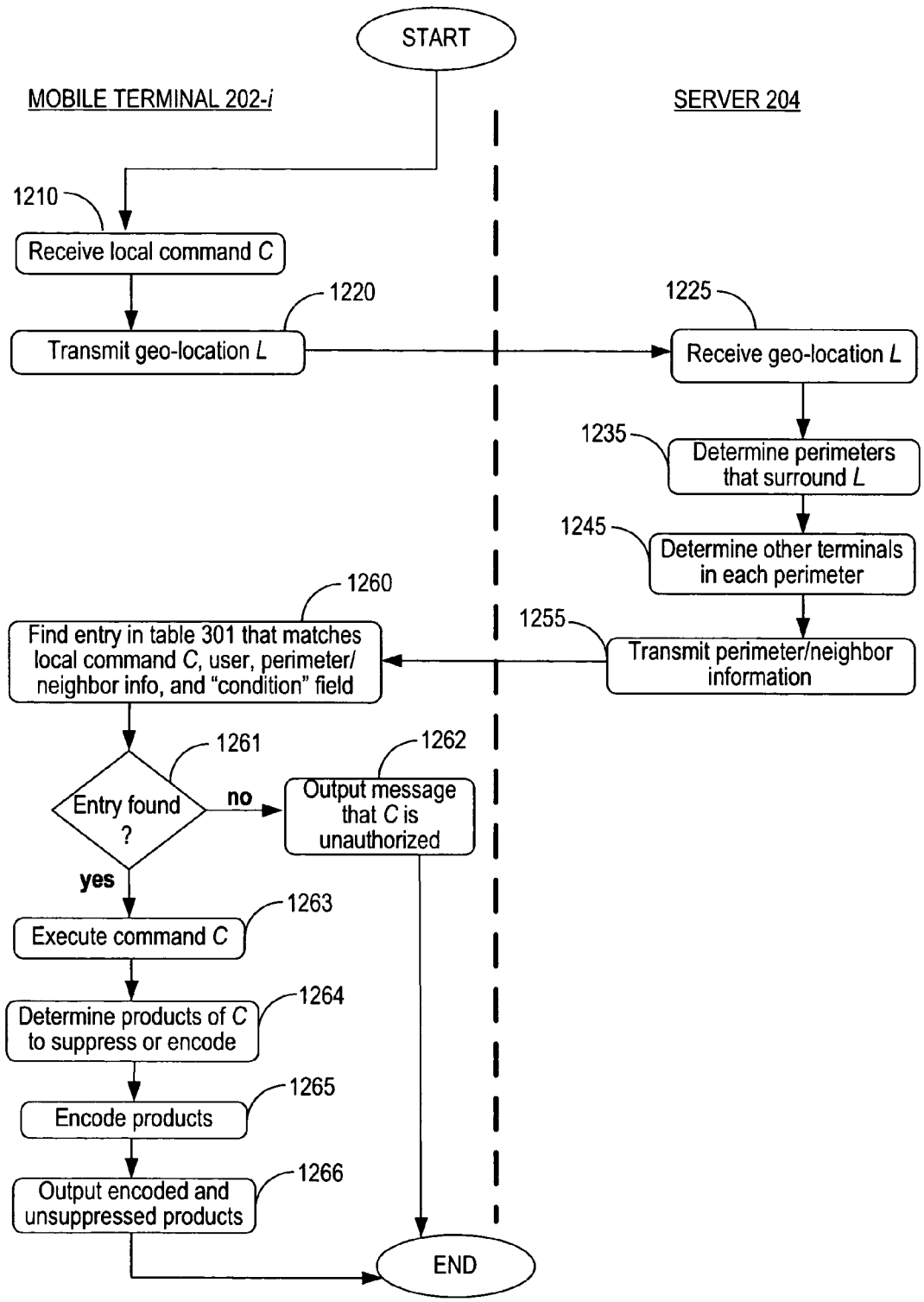
FIG. 12 depicts a second flowchart of the operation of wireless terminal 202-$i$ and server 204 in response to a local command input at wireless terminal 202-$i$, in accordance with the illustrative embodiment of the present invention.

FIG. 12 depicts a second flowchart of the operation of wireless terminal 202-i and server 204 in response to a local command input at wireless terminal 202-i, in accordance with the illustrative embodiment of the present invention. This second flowchart corresponds to embodiments in which the logic for determining whether a local command is authorized is performed by wireless terminal 202-i. In such embodiments, some or all of tables 301 through 404 might be stored in memory 503 of wireless terminal 202-i instead of, or in addition to, database 205. It will be clear to those skilled in the art which tasks depicted in FIG. 12 can be performed simultaneously or in a different order than that depicted.

At task 1210, wireless terminal 202-*i* receives a local command C from the user via input/output interface 506, in well-known fashion.

At task 1220, transmitter 504 of wireless terminal 202-*i* transmits its location L to server 204 via wireless access point 203, in well-known fashion.

At task 1225, server 204 receives location L.

At task 1235, processor 702 of server 204 determines the perimeters that surround location L.

At task 1245, processor 702 determines, based on the contents of tables 404 and 405, wireless terminals in the perimeters of task 1235 (i.e., "perimeter/neighbor information").

At task 1255, server 204 transmits the perimeter/neighbor information to wireless terminal 202-*i* via wireless access point 203, in well-known fashion.

At task 1260, processor 502 of wireless terminal 202-*i* attempts to find an entry in table 301 that matches the local command C, user, perimeter/neighbor info, and the "condition" field.

At task 1261, processor 502 performs a branch based on whether an entry was found at task 1260. If an entry was not found, execution continues at task 1262, otherwise execution continues at task 1263.

At task 1262, processor 502 outputs to input/output interface 506 a message indicating that local command C is unauthorized, and the message is presented to the user of wireless terminal 202-*i*. After task 1262, the method of FIG. 12 terminates.

At task 1263, processor 502 executes local command C, in well-known fashion.

At task 1264, processor 502 determines, based on the perimeter/neighbor information received from server 204, which products of command C, if any, should be suppressed or encoded.

At task 1265, processor 502 encodes the appropriate products of command C, in well-known fashion.

At task 1266, processor 502 outputs the unsuppressed products of command C (both encoded and un-encoded) to input/output interface 506 for presentation (e.g., display, etc.) to the user. After task 1266, the method of FIG. 12 terminates.

Figure 13:
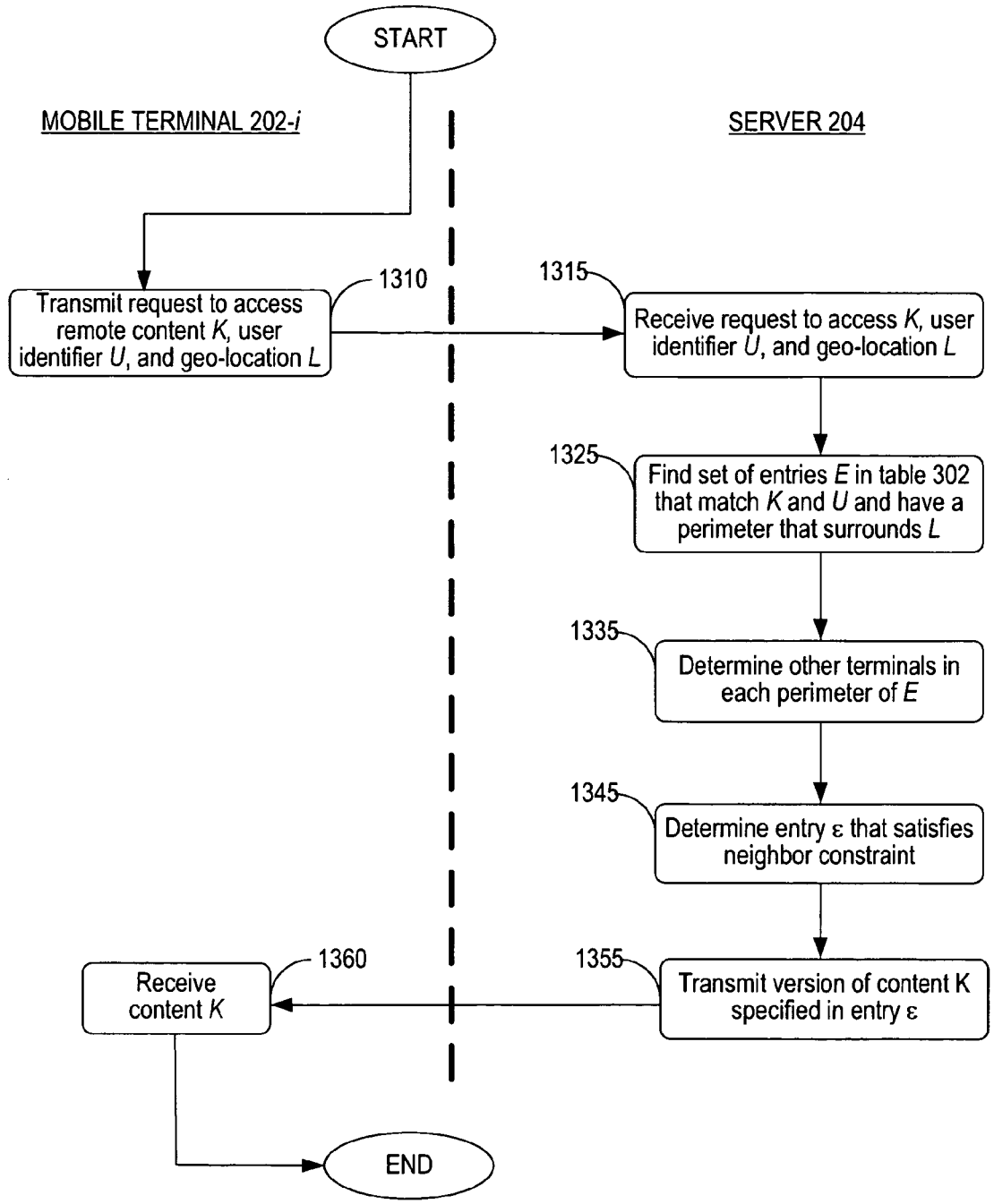
FIG. 13 depicts a flowchart of the operation of wireless terminal 202-$i$ and server 204 in response to a request to access remote content at wireless terminal 202-$i$, in accordance with the illustrative embodiment of the present invention.

FIG. 13 depicts a flowchart of the operation of wireless terminal 202-*i* and server 204 in response to a request to access remote content at wireless terminal 202-*i*, in accordance with the illustrative embodiment of the present invention. It will be clear to those skilled in the art which tasks depicted in FIG. 13 can be performed simultaneously or in a different order than that depicted.

At task 1310, wireless terminal 202-*i* transmits to server 204, via wireless access point 203: (i) a request to access remote content K that was input by the user of wireless terminal 202-*i*, (ii) an identifier U that indicates the user of wireless terminal 202-*i* (e.g., a username, etc.), and (iii) the location L of wireless terminal 202-*i*, in well-known fashion. In some embodiments in which wireless terminal 202-*i* is used by a single user only, the identifier might indicate the terminal itself, while in embodiments in which different users might use wireless terminal 202-*i*, the user could identify himself or herself by initially logging in to the terminal, or by inserting a personalized Single In-line Memory Module (SIMM) card into a memory slot of wireless terminal 202-*i*, etc.

At task 1315, server 204 receives, via wireless access point 203, the request to access remote content K, identifier U, and location L, in well-known fashion.

At task 1325, server 204 searches table 302 and determines the set of entries E in the table that (i) match content K, (ii) match user identifier U, and (iii) have a perimeter that surrounds location L.

At task 1335, processor 702 consults terminal location table 405 and determines which wireless terminals 202 are inside which perimeter of entry set E.

At task 1345, processor 702 determines the entry $\epsilon$ in E that has its "neighbor" field satisfied by the results obtained in task 1335, in well-known fashion.

At task 1355, processor 702 transmits to wireless terminal 202-*i*, via wireless access point 203, the appropriate version of content K as specified in entry c.

At task 1360, receiver 501 of wireless terminal 202-*i* receives, via wireless access point 203, content K from server 204 in well-known fashion. After task 1360 the method of FIG. 13 terminates.

Figure 14:
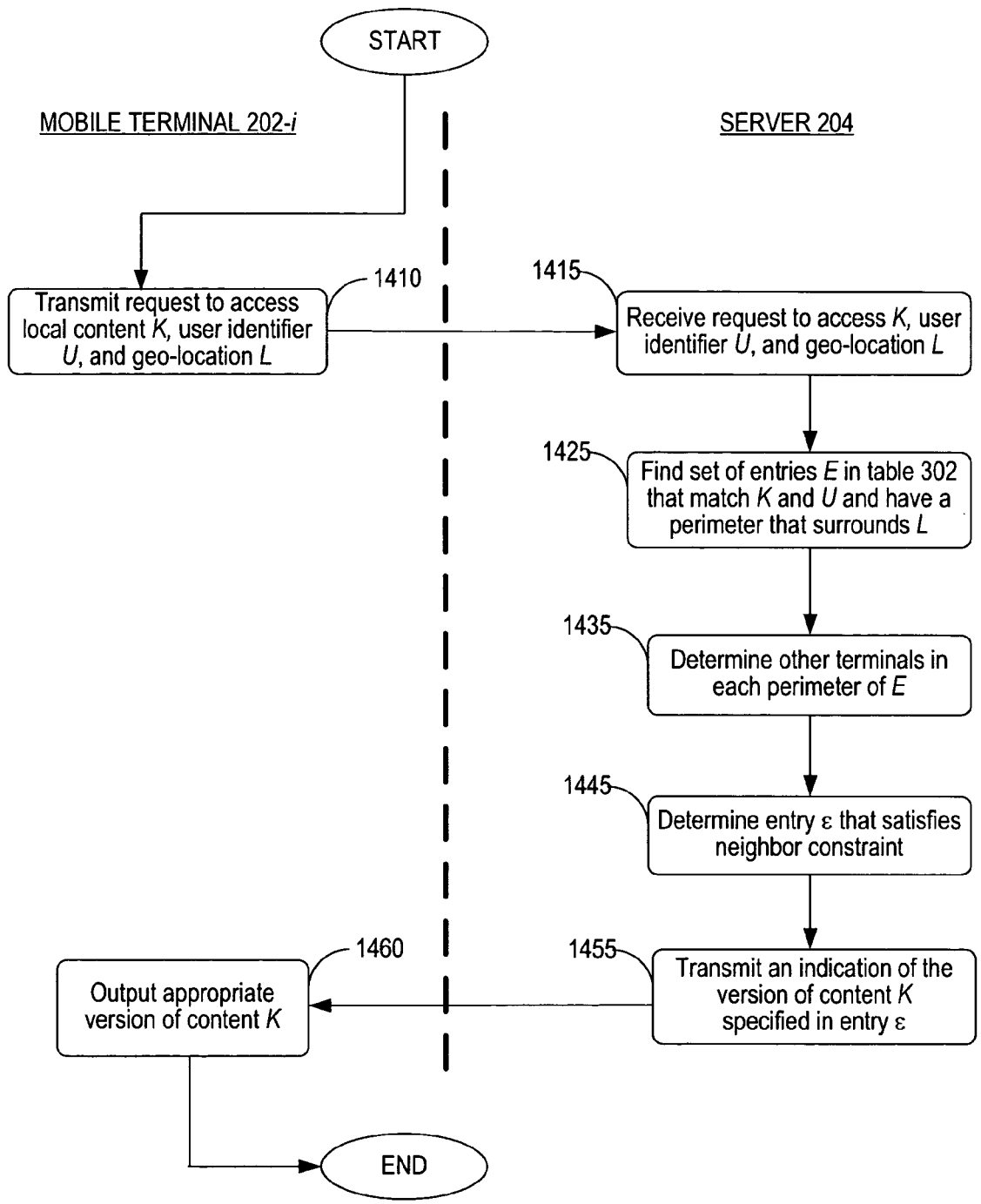
FIG. 14 depicts a first flowchart of the operation of wireless terminal 202-$i$ and server 204 in response to a request to access local content at wireless terminal 202-$i$, in accordance with the illustrative embodiment of the present invention.

FIG. 14 depicts a first flowchart of the operation of wireless terminal 202-*i* and server 204 in response to a request to access local content at wireless terminal 202-*i*, in accordance with the illustrative embodiment of the present invention. This first flowchart corresponds to embodiments in which the logic for determining the correct version of content is performed by server 204. It will be clear to those skilled in the art which tasks depicted in FIG. 14 can be performed simultaneously or in a different order than that depicted.

At task 1410, wireless terminal 202-*i* transmits to server 204, via wireless access point 203: (i) a request to access local content K that was input by the user of wireless terminal 202-*i*, (ii) an identifier U that indicates the user of wireless terminal 202-*i* (e.g., a username, etc.), and (iii) the location L of wireless terminal 202-*i*, in well-known fashion.

At task 1415, server 204 receives, via wireless access point 203, the request to access local content K, identifier U, and location L, in well-known fashion.

At task 1425, server 204 searches table 302 and determines the set of entries E in the table that (i) match content K, (ii) match user identifier U, and (iii) have a perimeter that surrounds location L.

At task 1435, processor 702 consults terminal location table 405 and determines which wireless terminals 202 are inside which perimeter of entry set E.

At task 1445, processor 702 determines the entry $\epsilon$ in E that has its "neighbor" field satisfied by the results obtained in task 1335, in well-known fashion.

At task 1455, processor 702 transmits to wireless terminal 202-*i*, via wireless access point 203, an indication of the version of content K specified in entry $\epsilon$.

At task 1460, processor 502 of wireless terminal 202-*i* accordingly outputs the appropriate version of content K to input/output interface 506 for presentation to the user. After task 1460 the method of FIG. 13 terminates.

Figure 15:
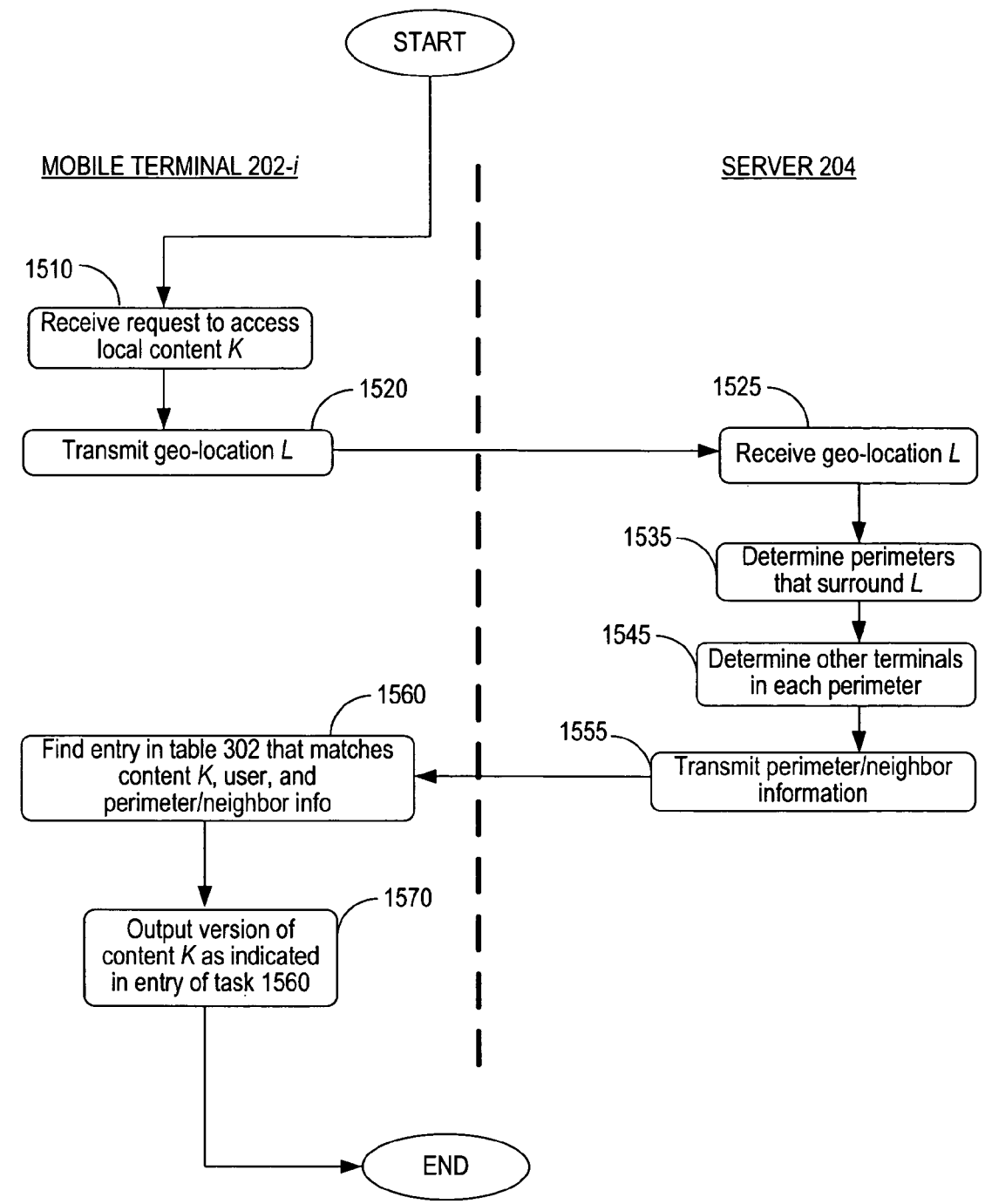
FIG. 15 depicts a second flowchart of the operation of wireless terminal 202-$i$ and server 204 in response to a request to access local content at wireless terminal 202-$i$, in accordance with the illustrative embodiment of the present invention.

FIG. 15 depicts a second flowchart of the operation of wireless terminal 202-*i* and server 204 in response to a request to access local content at wireless terminal 202-*i*, in accordance with the illustrative embodiment of the present invention. This second flowchart corresponds to embodiments in which the logic for determining the correct version of content is performed by wireless terminal 202-*i*. In such embodiments, tables 302 and 404 might be stored in memory 503 of wireless terminal 202-*i* instead of, or in addition to, database 205. It will be clear to those skilled in the art which tasks depicted in FIG. 15 can be performed simultaneously or in a different order than that depicted.

At task 1510, wireless terminal 202-*i* receives a request to access local content K from the user via input/output interface 506, in well-known fashion.

At task 1520, transmitter 504 of wireless terminal 202-i transmits its location L to server 204 via wireless access point 203, in well-known fashion.

At task 1525, server 204 receives location L.

At task 1535, processor 702 of server 204 determines the perimeters that surround location L.

At task 1545, processor 702 determines, based on the contents of tables 404 and 405, wireless terminals in the perimeters of task 1535 (i.e., "perimeter/neighbor information").

At task 1555, server 204 transmits the perimeter/neighbor information to wireless terminal 202-i via wireless access point 203, in well-known fashion.

At task 1560, processor 502 of wireless terminal 202-i determines the entry in table 302 that matches the local content K, user, and perimeter/neighbor information received from server 204, in well-known fashion.

At task 1570, processor 502 of wireless terminal 202-i accordingly outputs the appropriate version of content K to input/output interface 506 for presentation to the user. After task 1570 the method of FIG. 15 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    receiving, at a first wireless terminal, a request from a first user to access content associated with the first wireless terminal;
    when a second wireless terminal associated with a second user is within a distance D of the first wireless terminal, displaying the content, via the first wireless terminal, as text; and
    when the second wireless terminal is not within the distance D of the first wireless terminal, providing the content as audio via the first wireless.

2. The method of claim 1, wherein the content comprises a setting of the first wireless terminal.

3. The method of claim 1, wherein the content comprises an acoustic signal.

4. A method comprising:
    receiving, at a first wireless terminal, an input for placing a call;
    determining if a second wireless terminal is within a distance of the first wireless terminal to yield a first determination;
    when the first determination indicates that the second wireless terminal is within the distance of the first wireless terminal, determining whether the call is authorized in a presence of a user associated with the second wireless terminal to yield a second determination; and
    placing the call only when the second determination indicates that the call is authorized in the presence of the user.

5. A method comprising:
    receiving a remote command that is submitted by a first user of a first wireless terminal;
    executing the remote command to yield a value;
    determining if a second wireless terminal is within a distance of the first wireless terminal to yield a first determination;
    when the first determination indicates that the second wireless terminal is within the distance of the first wireless terminal, determining whether transmission of the value to the first wireless terminal is authorized in a presence of a second user associated with the second wireless terminal to yield a second determination; and
    transmitting the value to the first wireless terminal only when the second determination indicates that transmission of the value to the first wireless terminal is authorized in the presence of the second user.

6. The method of claim 5, wherein the remote command is for updating a second value in a database.

* * * * *